United States Patent Office 3,311,531
Patented Mar. 28, 1967

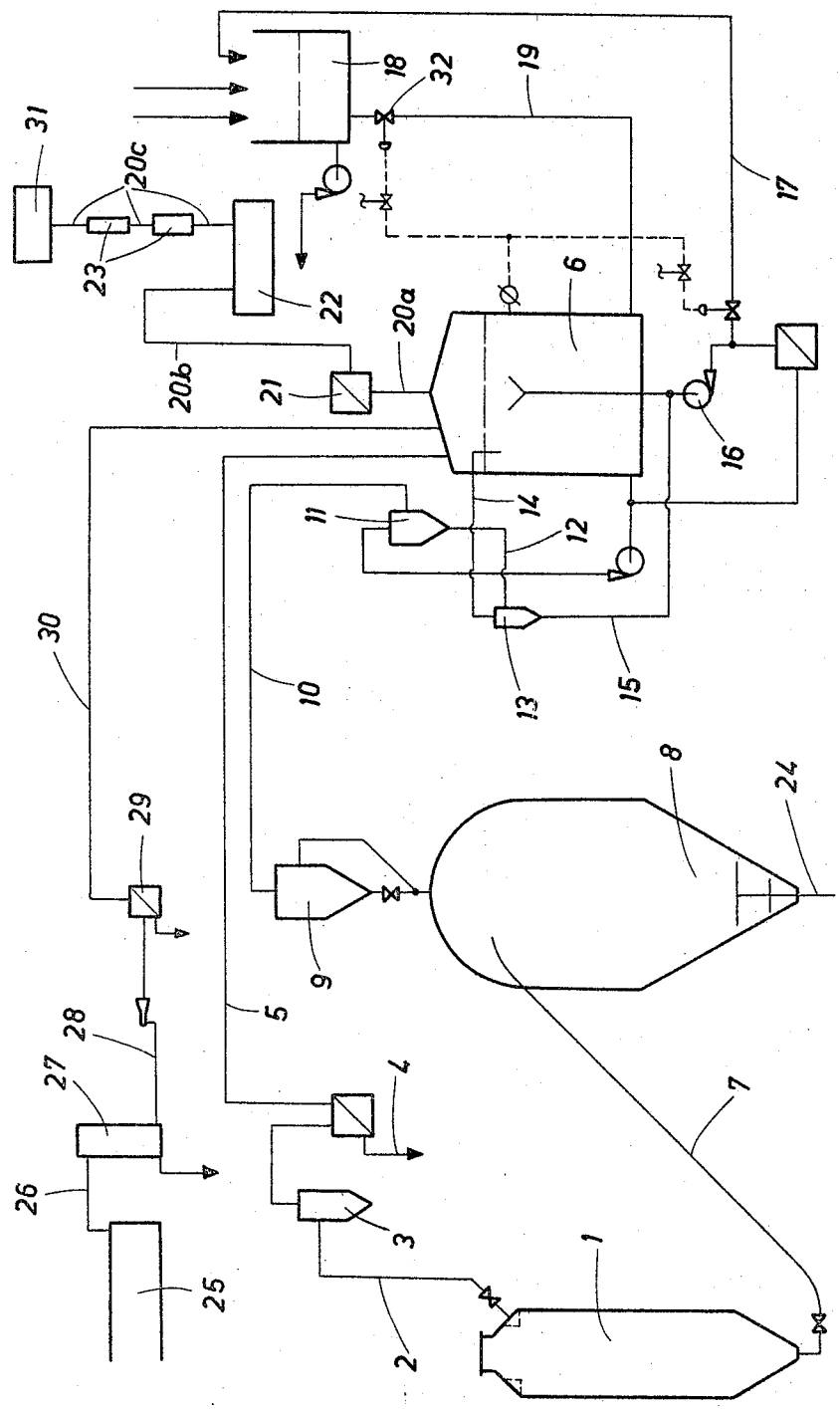

3,311,531
PROCESS OF PRODUCING SULFATE PULP WITH REMOVAL OF OFFENSIVELY SMELLING GASES
Othmar Feischl, Friedrich Knoll, and Gerhard Puschmann, all of Ansfelden, Austria, assignors to Nettingsdorfer Papier- und Sulfatzellulose-Fabrik Aktiengesellschaft, Nettingsdorf, Austria
Filed June 6, 1963, Ser. No. 286,093
Claims priority, application Austria, June 7, 1962, A 4,589/62; Jan. 11, 1963, A 209/63
13 Claims. (Cl. 162—51)

In the production of sulfate pulp with the aid of digesting liquors containing sodium sulfide, offensively smelling gases are formed, particularly hydrogen sulfide, mercaptans, such as methyl mercaptan, and alkyl sulfides, such as dimethyl sulfide. To remove these gases they have usually been fed to a furnace, such as a producer, a soda furnace, lime kilns or the like. To avoid explosion, the gases must be highly diluted with air. Because it is not possible in this practice to give consideration to the air requirement of the furnace but the rate of the gas-air mixture must be selected so as to obtain a mixture which is below the explosion limit even at the maximum rate of gas production, the temperature is often below the value required for a complete oxidation of sulfur compounds. For this reason, all these plants are not satisfactory in operation in spite of the use of external energy.

It has also been proposed to cool the gases to their dew point and blow them into a combustion chamber succeeding a rotary kiln. Because in this case the combustion is also incomplete in spite of the use of external energy (waste heat from the rotary kiln), it has been suggested to treat the waste gases from the rotary kiln with terpenes or similar compounds which are to absorb or decompose the unburnt, offensively smelling gases. None of the previously known processes enables a collection of the gases without dilution with air and a supply of the gases in concentrated form to the furnace.

The invention enables a complete elimination of the offensively smelling gases by collecting the gases at the places where they are formed and conducting the gases to a common container, where they are mixed and from which they are conducted in an approximately uniform concentration and at a uniform rate and without dilution to a reaction station, where they are oxidized without supply of external energy. Hence, the process according to the invention results in an equalization of the variations in the rates and concentrations of the waste gases formed at various points and enables a continuous discharge of these gases from the mixing container. The heat generated by the subsequent oxidation of the gases with atmospheric oxygen is sufficient to maintain the combustion and for effecting a complete oxidation of all offensively smelling compounds.

Offensively smelling gases are formed in the evaporator, during the turpentine gas removal, and during the discharge of the digesters into the blow pit or diffuser. The gases from the evaporator are obtained at a uniform rate and in a uniform composition so that they can be directly fed to the reaction station after they have been cooled. During the turpentine gas removal and, above all, during the blowing of the digester, however, gases of varying composition are obtained in intervals at high rates. These gases must be collected and mixed in a container. According to the invention, the condensate container succeeding the blow pit used in the production of sulfate pulp is used as such a common container. By lowering and raising the water level in this condensate container, the shock due to blowing may be absorbed and the gas may be displaced out of the container and fed to the reaction station at a uniform rate. To minimize the gas volumes, the gases are cooled before entering the condensate container.

In a development of the invention, a suction of the gases back into the blow pit during the intervals between blowing is prevented by submerging the gas conduit in the condensate container below the liquid level. A negative pressure in the common container may also be avoided by filling the blow pit with steam during the intervals between blowing so that a suction of gases back into the blow pit during these intervals is prevented. Hence, a slight super-atmospheric pressure is maintained in the blow pit during the intervals between blowing.

In order to obtain undiluted gases also where diffusers are employed, the diffuser is filled with steam or evacuated according to the invention before the digester is blown. Hence, the air in the diffuser is displaced by steam or sucked off by a vacuum pump.

An illustrative embodiment of the invention will be explained in more detail with reference to the accompanying drawing, in which a plant suitable for carrying out the process according to the invention is shown.

The digester 1 consisting of an upright, cylindrical pressure vessel is filled with wood chips and liquor and closed. The liquor is directly or indirectly heated. The digester is vented during its operation. This permits of an escape of air, water vapor, turpentine and the offensively smelling gases produced by the digestion (hydrogen sulfide, mercaptans etc.). The water vapor and the turpentine vapors are condensed in a condenser 3, which is connected by a conduit 2 to the digester 1, and the condensates are withdrawn at 4. The uncondensed gases are conducted in the conduit 5 into the condensate container 6 succeeding the blow pit 8.

After the predetermined digesting period, the pressure in the digester 1 is reduced either by venting into the blow pit or by injecting cold liquor and the digester 1 is discharged under the action of the pressure therein through a blowing conduit 7 into the blow pit 8. The vapors which are released as a result of the pressure drop are passed through a cyclone separator 9 to remove fibers and liquor and are then conducted in a conduit 10 to a jet condenser 11, where they are condensed.

The jet condenser 11 contains a mixture of hot condensate formed from the blown vapors and of uncondensed gases. This mixture is conducted in a conduit 12 to a cyclone 13 for separation. The gases are conducted in a conduit 14 to the upper part of the condensate container 6 and the hot condensate is conducted in a conduit 15 directly to the circulating pump 16. A control is provided to lower the liquid level in the condensate container 6 during the blowing operation in accordance with the supply of uncondensed gases. This lowering of the liquid level is effected by pumping the condensate from the container 6 in a conduit 17 into a hot water container 18. When the blowing operation has been terminated, the valve 32 is opened to supply water from the hot water container 18 in a conduit 19 to the condensate container 6 to raise the liquid level in the latter and displace the uncondensed gases from the container 6. As a result, the gases will mix in the condensate container 6 and will be discharged from it at a uniform rate. These gases are conducted in the conduits 20a, 20b and 20c through a heat exchanger 21, a water seal 22 and means 23 to prevent backfiring to the reaction device diagrammatically indicated as a furnace 31.

The mixture of pulp and spent liquor is pumped from the blow pit 8 in a conduit 24 to the washing station, not shown, where a separation between spent liquor and pulp is effected. The pulp is sorted for further processing in the paper manufacturing plant. The spent liquor is concentrated in a multi-stage evaporator 25 and then burnt in a special furnace. The uncondensible gases formed during the evaporation are fed to the condensate container 6 through a conduit 26, a surface condenser 27, a conduit 28, a heat exchanger 29 and a conduit 30. In certain cases, the uncondensible gases from the evaporator may by-pass the condensate container 6 and the directly fed to the water seal 22, where they mix with the other waste gases and from which they are fed to the reaction or combustion station.

What we claim is:

1. In a process which involves a formation of offensively smelling, oxidizable gases at a plurality of points at varying rates and concentrations, the steps of conducting said gases from at least two of said points into a common container, maintaining a body of liquid in said container, admitting said gases from said points to said container to mix in said container, feeding the resulting gas mixture to an oxidizing station, controlling the admission and the feeding of said gases to equalize the varying rates and concentrations of the gases by lowering and raising the level of said body of liquid in said container, and oxidizing said gas mixture in said oxidizing station.

2. A process as set forth in claim 1, in which said gases from all said points are collected in said common container.

3. A process as set forth in claim 1, in which said gas mixture is fed to said oxidizing station in undiluted condition.

4. A process as set forth in claim 1, in which said gas mixture is fed to said oxidizing station at a concentration within a predetermined range and at a rate within a predetermined range.

5. A process as set forth in claim 4, in which said oxidizing station is supplied with oxygen at a rate enabling the maintenance in said oxidizing station of a reaction in which said gas mixture is completely oxidized without requiring extraneous energy whereas said rate at which oxygen is supplied is less than that required to form an explosive mixture with said gas mixture in said oxidizing station.

6. A process as set forth in claim 4, in which said gas mixture is fed to said oxidizing station at an approximately uniform concentration and at a uniform rate.

7. A process as set forth in claim 1, in which said gases are conducted from one of said points into said container during admission periods and the gas flow communication between the interior of said container and said one point is interrupted between said admission periods by a body of liquid in said container.

8. A process as set forth in claim 7, in which said gases are conducted in conduit means from said one point into said container and said conduit means are submerged in said body of liquid between said admission periods.

9. A process as set forth in claim 1, in which sulfate pulp is produced by digesting wood chips under pressure and in contact with an aqueous liquor during digesting periods in a digester, steam and said oxidizable gases are blown from said digester during blowing intervals between said digesting periods, the oxidizable gases are condensed, and the resulting condensate is collected in said container.

10. A process as set forth in claim 9, in which said steam and oxidizable gases are blown from said digester during said blowing intervals into a blow pit forming one of said points.

11. A process as set forth in claim 10, in which the gas flow communication between the interior of said container and said blow pit is interrupted between said blowing periods by the body of liquid in said container.

12. A process as set forth in claim 9, in which said steam and oxidizable gases are blown from said digester during said blowing intervals into a receiver forming one of said points and said receiver is filled with steam before said blowing intervals.

13. A process as set forth in claim 9, in which said steam and oxidizable gases are blown from said digester during said blowing intervals into a diffuser forming one of said points and said diffuser is evacuated before said blowing intervals.

References Cited by the Examiner
UNITED STATES PATENTS

| | | | |
|---|---|---|---|
| 1,854,428 | 4/1932 | Segerfelt | 162—51 |
| 3,183,145 | 5/1965 | Collins | 162—51 X |

DONALL H. SYLVESTER, *Primary Examiner.*

HOWARD R. CAINE, *Examiner.*